United States Patent

Haga et al.

[11] Patent Number: 5,906,250
[45] Date of Patent: May 25, 1999

[54] MOTOR-DRIVEN POWER STEERING APPARATUS

[75] Inventors: Kyousuke Haga, Anjo; Kiyotaka Kato, Nishio; Yutaka Mori, Toyohashi; Tsutomu Matsumoto; Tsuguhiro Somekawa, both of Kariya, all of Japan

[73] Assignee: Toyoda Koki Kabushiki Kaisha, Kariya, Japan

[21] Appl. No.: 08/847,605

[22] Filed: Apr. 25, 1997

[51] Int. Cl.⁶ ..................................................... B62D 5/04
[52] U.S. Cl. ........................................... 180/444; 180/446
[58] Field of Search ................................ 180/443, 444, 180/445, 446

[56] References Cited

U.S. PATENT DOCUMENTS

| | | | |
|---|---|---|---|
| 4,681,181 | 7/1987 | Shimizu | 180/443 |
| 4,688,655 | 8/1987 | Shimizu | 180/443 |
| 4,727,950 | 3/1988 | Shimizu et al. | 180/443 |
| 4,756,376 | 7/1988 | Shimizu | 180/443 |

FOREIGN PATENT DOCUMENTS

| | | |
|---|---|---|
| 56-4973 | 6/1954 | Japan . |
| 61-86602 | 5/1986 | Japan . |

*Primary Examiner*—Kevin Hurley
*Attorney, Agent, or Firm*—Oblon, Spivak, McClelland, Maier & Neustadt, P.C.

[57] ABSTRACT

An electric power steering apparatus comprises an input shaft transmitting a rotation from a steering wheel and an output shaft rotatably connected to the input shaft through a torsion bar relative to the input shaft. A drive motor is coaxially arranged relative to both of the input shaft and the output shaft. A reduction mechanism coaxially provided in a housing relative to the input and output shaft transmits a rotation of the drive motor to the output shaft so as to reduce the rotation of the drive motor at a constant reduction rate. A torque sensor detects a torque added to the torsion bar as a relative rotational displacement between the input shaft and the output shaft. The drive motor is rotationally controlled in accordance with the detected torque by the torque sensor.

4 Claims, 3 Drawing Sheets

MOTOR-DRIVEN POWER STEERING APPARATUS

BACKGROUND OF THE INVENTION

1. Field of the Invention

The present invention relates to an electric power steering apparatus for assisting a steering operation.

2. Description of the Related Art

In an electric power steering apparatus in which an assist force corresponding to a detected torque is obtained by an electric motor, it is disclosed that the electric motor is coaxially arranged between an input shaft and an output shaft, in Japanese Utility Model Publication (KOUKAI) No. 56-4973.

3. Problems to be Solved by the Invention

In the electric power steering apparatus described above, there are arranged a torque sensor detecting a torque corresponding to a relative rotational angle difference between the input and output shafts, the electric motor and a reduction mechanism, sequently in line in an axial direction of the shaft. However, since it is required to make shaft lengths of the input and output shafts long, such an apparatus has a drawback to be jumboized as a whole. Further, the torque sensor is arranged so as to be projected outwardly of the apparatus, so that water, dust and the like tend to stick to the torque sensor, whereby there is a problem to be affected in a torque detection accuracy.

SUMMARY OF THE INVENTION

Accordingly, to solve the above-described problems, an object of the present invention is to provide an electric power steering apparatus capable of being downsized as a whole.

Another object of the present invention is to provide an electric power steering apparatus including a torque sensor which is capable of detecting a torque sensitively.

Briefly, according to the present invention, an electric power steering apparatus comprises an input shaft transmitting a rotation from a steering wheel and an output shaft rotatably connected to the input shaft through a torsion bar relative to the input shaft. A drive motor is coaxially arranged relative to both of the input shaft and the output shaft. A reduction mechanism coaxially provided in a housing relative to the input and output shaft transmits a rotation of the drive motor to the output shaft so as to reduce the rotation of the drive motor at a constant reduction rate. A torque sensor detects a torque added to the torsion bar as a relative rotational displacement between the input shaft and the output shaft. The drive motor is rotationally controlled in accordance with the detected torque by the torque sensor.

The torque sensor detecting the torque added from the steering wheel is coaxially arranged relative to both of the input and output shafts, so that the axial lengths of the input and output shafts can be shortened, whereby the electric power steering apparatus according to the present invention can be downsized as a whole.

Further, the torque sensor is arranged so as to be separated from the reduction mechanism, so that it prevents from sticking water, dust and the like.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Figure 1:
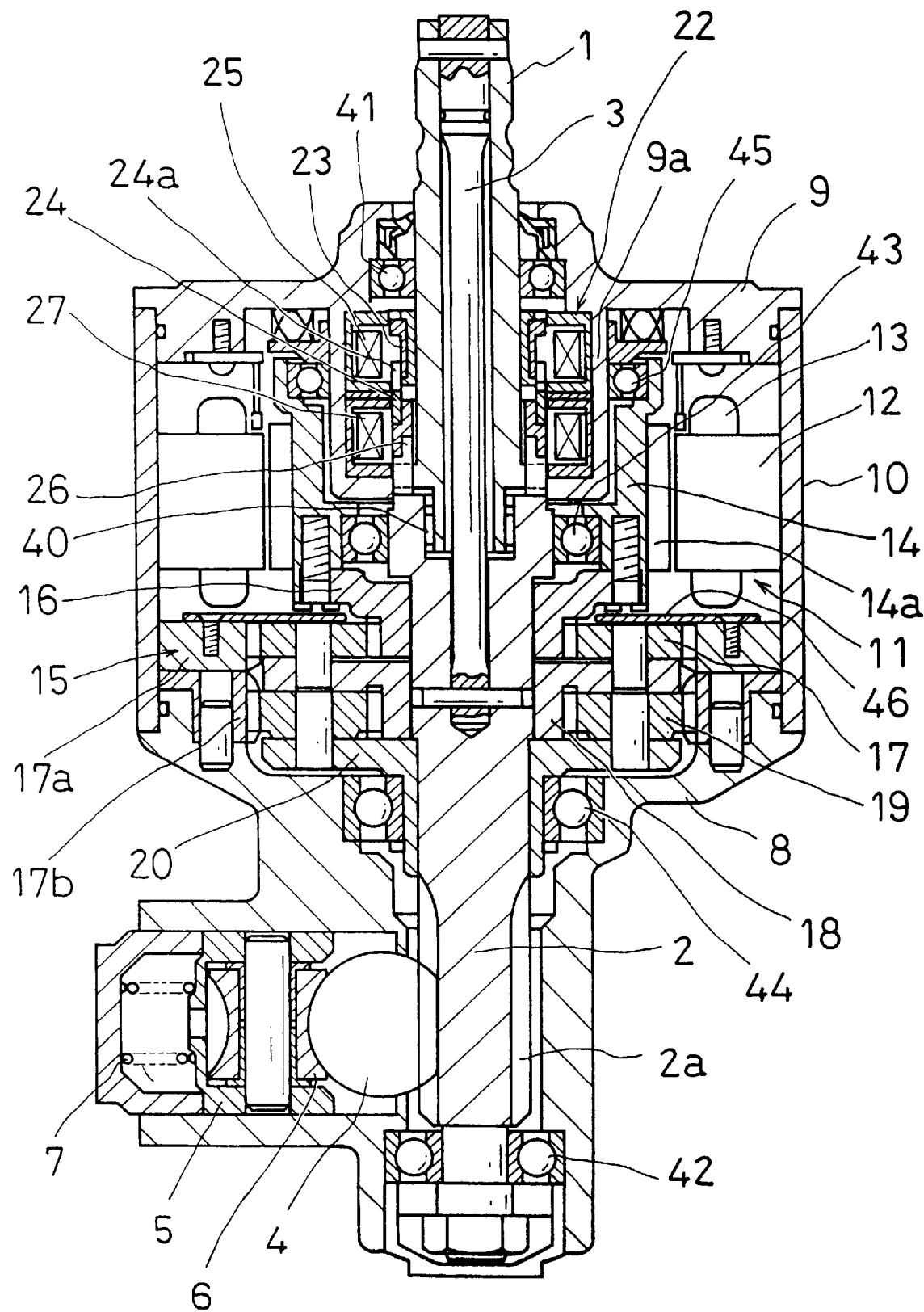
FIG. 1 shows a sectional view of an electric power steering apparatus according to the present invention.

An embodiment according to the present invention will be explained hereinafter referring to the drawings. In FIG. 1, numeral 1 denotes an input shaft connected to a steering wheel (not shown), which rotates therewith. The input shaft 1 takes the form of a hollow pipe in which one end of a torsion bar 3 running through the input shaft 1 is secured thereto by a pin.

Numeral 2 denotes an output shaft which is rotatably connected through a needle bearing 40 to the input shaft 1, and the other end of the torsion bar 3 is connected thereto. Namely, the output shaft 2 is rotatable relative to the input shaft 1 by a torsional action of the torsion bar 3.

The input shaft 1 is rotatably supported on an upper housing 9 through a seal member and a bearing 41, while the output shaft 2 is rotatably supported on a lower housing 8 through bearings 42 and 44. A cylindrical member 10 is disposed between the upper and lower housings 9 and 8. Further, a drive motor 11, a reduction mechanism 15 and a torque sensor 22 are disposed within a space defined by the upper housing 9, the cylindrical member 10 and the lower housing 8. Thus, in this embodiment, a housing is composed of three portions of the upper and lower housings 9 and 8 and the cylindrical member 10, so that it has an advantage that can be easily assembled.

On an end portion of the output shaft 2, there is formed a pinion 2a which is engaged with a rack rail of a rack shaft 4 in a steering mechanism. The rack shaft 4 is supported in a direction in mesh at a suitable pressure, by a supporting member 6 which is provided on a rack guide 5 urged by a spring 7.

Figure 2:
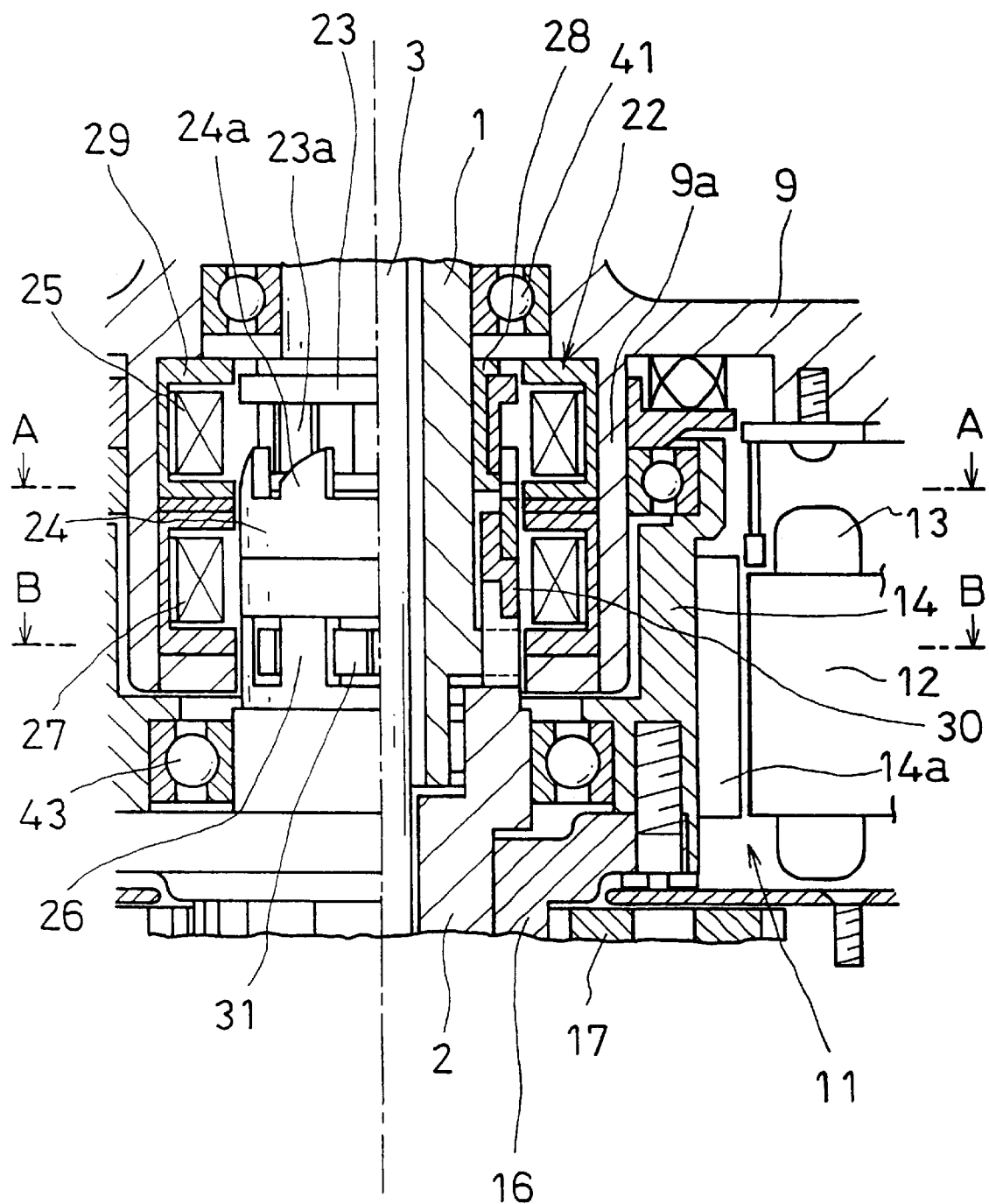
FIG. 2 shows an enlarged sectional view of an electric power steering apparatus according to the present invention.

The drive motor 11 is coaxially arranged in respect to both of the input and output shafts 1 and 2. As shown in FIG. 2, on an inside wall of the cylindrical member 10, there is secured a stator 12 having a coil 13, in which a rotor 14 opposite with the stator 12 is rotatably connected to the output shaft 2 through a bearing 43. Numeral 14a denotes a plurality of permanent magnets which are provided around an outer surface of the rotor The reduction mechanism 15 reduces a rotation of the motor 11 and transmits the reduced rotation to the output shaft 2 in which the motor 11 is rotated at a speed corresponding to a torque detected by a torque sensor 22 which torque is added from the steering wheel. The construction of the torque sensor 22 will be described in detail hereafter. In this embodiment, a planetary gear train is applied as the reduction mechanism 15, for example.

The construction of the reduction mechanism 15 will be explained in detail hereinafter.

A first sun gear 16 is secured to the rotor 14 of the drive motor 11 and, a first ring gear 17a is secured to an inner surface of the cylindrical member 10. A first pinion gear 17 engaged with both of the first sun gear 16 and the first ring gear 17a rotates around the output shaft 2 upon rotation of the first sun gear 16 as itself rotates. A second sun gear 18 rotatably supported in respect to the output shaft 2 is connected to the first pinion gear 17 through a pin, so that the second sun gear 18 rotates around the output shaft 2 by the rotation of the first pinion gear 17 around the output shaft 2. A second pinion gear 19 is engaged with both of the second sun gear 18 and a second ring gear 17b fixed to the lower housing 8, and connected through a pin to a rotating member 20 fixed to the output shaft 2. When the second sun gear 18 rotates upon rotation of the first pinion gear 17 as described above, since the second ring gear 17b is secured to the lower housing 8, the second pinion gear 19 revolves around the output shaft 2 as itself also rotates. Consequently on the rotation of the second pinion gear 19 around the output shaft 2, the rotating member 20 with the second pinion gear 19 rotates around the output shaft 2.

In this construction described above, the rotation of the first sun gear 16 (i.e., the rotation of the rotor 11) is reduced in a reverse rotational direction of the first sun gear 16 while its rotation is transmitted from the first sun gear 16 to the second sun gear 18. Further, the rotation of the second sun gear 18 is reduced in a reverse rotational direction of the second sun gear 18 (i.e., the same rotational direction of the rotor 11) while its rotation is transmitted from the second sun gear 18 to the rotating member 20. Namely, the rotation of the first sun gear 16 is transmitted in the same direction of the rotor 11 to the output shaft 2 as being reduced at a constant rate.

In this embodiment, a width of tooth and/or a module in the second pinion gear 19 is respectively larger compared with those of the first pinion gear 17, so that stress corresponding to the transmitted torque after the reduction is balanced, whereby high torque transmission can be performed.

In this embodiment, since a cap plate 46 is fixed to the first ring gear 17a, this prevents the first and second pinion gears 17 and 19 from getting out in mesh. Further, the cap plate 46 functions so as to separate the drive motor 11 from the reduction mechanism 15, so that the dust and the like do not intrude into the drive motor 11.

The drive motor 11 is rotationally controlled in accordance with the detected torque by the torque sensor 22 which detects the torque added from the steering wheel. The torque sensor 22 is arranged within the rotor 14 of the drive motor 11 coaxially thereto.

The construction of the torque sensor 22 will be described with reference to FIG. 2 hereinafter. At an upper central portion of the upper housing 9, a cylindrical portion 9a is formed coaxially with the both of the input and output shafts 1 and 2, in which an inner sensor ring 23, an outer sensor ring 24 and a torque detection coil 25 are disposed.

Figure 3:
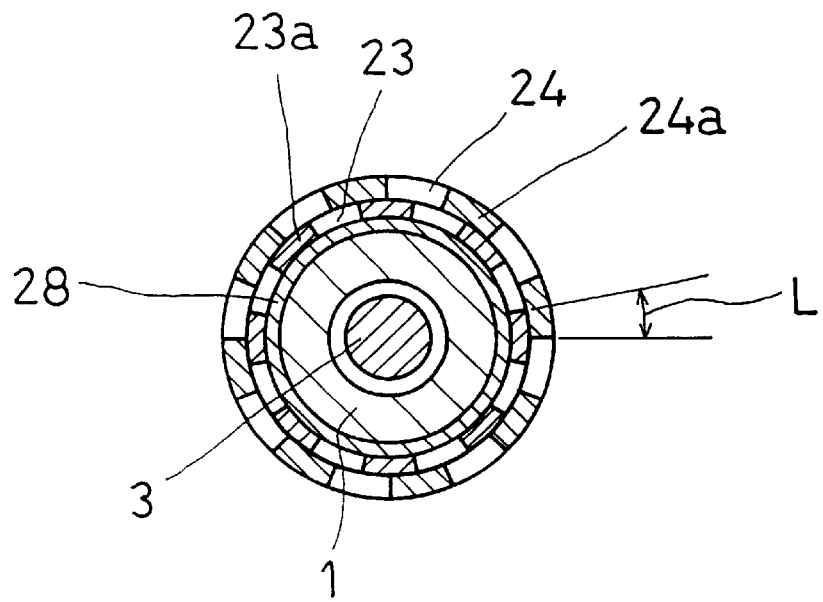
FIG. 3 is a sectional view taken along the line A—A shown in FIG. 1.

The inner sensor ring 23 is in the form of a cylindrical member made of magnetic substance, in which a plurality of rectangular tooth portions 23a are spaced at a constant pitch as shown in FIGS. 2 and 3. The inner sensor ring 23 is also connected to the input shaft 1 through a magnetic shielding spacer 28 made of a nonmagnetic substance, so as to rotate with the input shaft 1.

The outer sensor ring 24 is in the form of a cylindrical member made of a magnetic substance in which a plurality of tooth portions 24a are spaced at a constant pitch. In the tooth portion 24a, as shown in FIG. 2, a top portion is made inclined in respect to a circumferential direction of the output shaft 2. The outer sensor ring 24 is connected to the output shaft 2 through a magnetic shielding spacer 30 made of a nonmagnetic substance, so as to rotate with the output shaft 2.

The inner and outer sensor rings 23 and 24, as shown in FIG. 3, are arranged such that the tooth portion 23a faces with the tooth portion 24a, in which the changing of a lap L between the tooth portions 23a and 24a is detected by the torque detection coil 25.

The torque detection coil 25 is fixed to a sensor guide 29 so as to surround the tooth portions 23a and 24a. In such a construction, in case that an area of the lap L changes upon rotation of the steering wheel, inductance of the torque detection coil 25 changes corresponding to the changing of the lap L, so that an electromagnetic force generated at the torque detection coil 25 changes, whereby the torque corresponding to the steering operation is detected. Namely, the rotation of the steering wheel acts on the torsion bar 3 through the input shaft 1 and causes the torsion of the torsion bar 3. In such a situation, the inner sensor ring 23 rotates based upon the torque added from the steering wheel relatively to the outer sensor ring 24, so that the lap L between the tooth portions 23a and 24a changes, whereby the torque added from the steering wheel is detected by the torque detection coil 25 as the changing of the lap L, i.e., the changing of the inductance.

Figure 4:
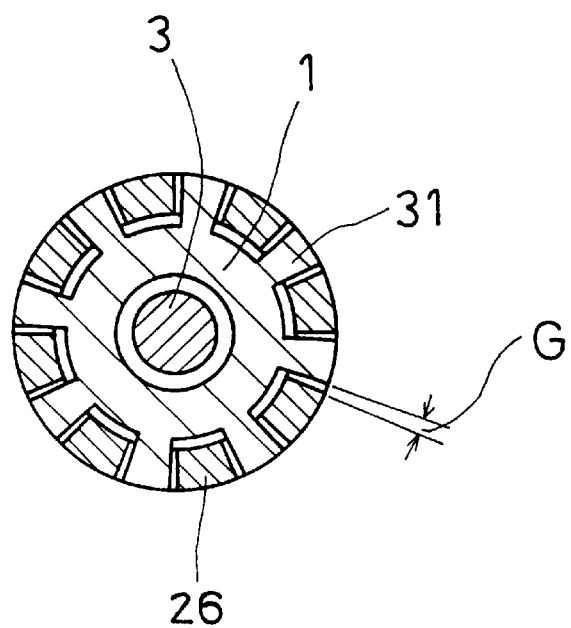
FIG. 4 is a sectional view taken along the line B—B shown in FIG. 1.

Further, a manual stopper is provided between the input and output shafts 1 and 2. A plurality of tooth portions 26 are formed on a ring fixed to the input shaft 1 and a plurality of projections 31 are formed on a ring fixed to the output shaft 1. The projection 31 is disposed between the adjacent two tooth portions 26 so as to keep a clearance G, as shown in FIG. 4. In such a construction, when the torque larger than the torsional reaction of the torsion bar 3 acts on the torsion bar 3 between the input and output shafts 1 and 2, a side surface of the projection 31 is brought into contact with a side surface of the tooth portion 26a. Consequently, the contact of projection 31 with the tooth potion 26 is detected by a manual stop detection coil 27 provided parallel to the torque sensor 22.

According to the present invention as described above, when the steering wheel is rotated in a right or left direction, the input shaft is also rotated in the same direction corresponding to the rotational direction of the steering wheel, so that the torsion bar 3 is twisted in the same direction. As a result of the torsion of the torsion bar 3, since the inner sensor ring 23 fixed to the input shaft 1 is rotated relatively to the outer sensor ring 24 fixed to the output shaft 2, the lap L between the tooth portions 23a and 24a changes upon relative rotation therebetween, whereby the changing of the lap L is detected by the torque detection coil 25 as the changing of the induction. Therefore, the torque added from the steering wheel is detected.

The drive motor 11 is rotationally controlled based upon the torque detected by the torque detection coil 25, and the rotation of the drive motor 11 is transmitted to the output shaft 2 through the reduction mechanism 15. Consequently, the steering operation can be assisted.

According to the present invention, the torque detection coil 25 detecting the torque added from the steering wheel is coaxially arranged relative to the inside of the rotor 14 of the drive motor 11, so that the axial lengths of the input and output shafts 1 and 2 can be shortened, whereby the electric power steering apparatus according to the present invention can be downsized as a whole.

Further, the torque sensor 22 which is coaxially arranged relative to the inside of the rotor 14 of the drive motor 11, is disposed in the cylindrical portion 9a of the upper housing 9 which is formed monolithically with the upper housing 9 and which is coaxially arranged relative to the both of the input and output shafts 1 and 2, so that it can prevent from sticking water, dust and the like, whereby the torque can be detected sensitivity. In this embodiment, one end of the rotor 14 is supported on the cylindrical portion 9a of the upper housing 9 through the bearing 45. Therefore, the axial length of the rotor 14 can be shortened, whereby the electric power steering apparatus can be further downsized.

The torque sensor 22 in this embodiment measures the torque by detecting the changing of the lap L between the tooth portion 23a of the inner sensor ring 23 and the tooth portion 24a of the outer sensor ring 24. However, the torque sensor 22 can be replaced with such a sensor that detects a clearance between a tooth portion formed on a sensor ring secured to the input shaft and a projection of a sensor ring secured to the output shaft which are meshed each other. Accordingly, The torque sensor 22 is not limited to that in this embodiment.

Further, the reduction mechanism 15 is not limited to the planetary gear train in this embodiment, harmonic drive and the like can be applied, for example.

According to the present invention as described above, the downsize of the electric power steering apparatus can be performed. Further, the torque sensor is separated from the reduction mechanism by the cap plate, so that it prevents from sticking water, dust and the like, whereby the torque can be detected sensitivity.

Obviously, numerous modifications and variations of the present invention are possible in light of the above teachings. It is therefore to be understood that within the scope of the appended claims, the present invention may be practiced otherwise than as specifically described herein.

What is claimed is:

1. An electric power steering apparatus comprising:

an input shaft transmitting a rotation from a steering wheel;

an output shaft rotatably connected to said input shaft through a torsion bar relative to said input shaft;

a drive motor coaxially arranged relative to both of said input shaft and said output shaft;

a reduction mechanism transmitting a rotation of said drive motor to said output shaft so as to reduce the rotation of said drive motor at a constant reduction rate; and a torque sensor arranged within said drive motor coaxially thereto and detecting a torque added to the torsion bar as a relative rotational displacement between said input shaft and said output shaft.

2. An electric power steering apparatus according to claim 1, said apparatus further comprising:

a stopper preventing the torsion bar from being twisted with a larger torque than a torsional reaction of the torsion bar.

3. An electric power steering apparatus according to claim 1, wherein said reduction mechanism is a planetary gear train.

4. An electric power steering apparatus according to claim 1, said torque sensor further comprising:

an inner sensor ring fixed to said input shaft and forming a plurality of inner tooth portion;

an outer sensor ring rotatably fixed to said output shaft relative to said output shaft and forming a plurality of an outer tooth which faces said inner tooth portion each other; and a torque detection coil coaxially arranged relative to both of said inner sensor ring and said outer sensor ring, said torque detection coil detecting the relative rotational displacement between said input shaft and said output shaft as a changing of inductance between said inner sensor ring and said outer sensor ring.

* * * * *